United States Patent
Yazawa et al.

(12) 
(10) Patent No.: US 6,193,784 B1
(45) Date of Patent: Feb. 27, 2001

(54) METHOD FOR PRODUCTION OF ZEOLITE MEMBRANE

(75) Inventors: Tetsuo Yazawa, Toyonou-gun; Tetsuro Jin; Koji Kuraoka, both of Ikeda, all of (JP)

(73) Assignee: Agency of Industrial Science & Technology, Ministry of International Trade & Industry, Tokyo (JP)

( * ) Notice: Subject to any disclaimer, the term of this patent is extended or adjusted under 35 U.S.C. 154(b) by 0 days.

(21) Appl. No.: 09/329,337

(22) Filed: Jun. 10, 1999

(30) Foreign Application Priority Data

Jun. 29, 1998 (JP) .................................................. 10-199810

(51) Int. Cl.$^7$ ............................ B01D 53/22; B01D 71/02
(52) U.S. Cl. .................................. 95/45; 96/11; 427/245; 428/34.5
(58) Field of Search ........................... 95/45; 96/4, 10, 96/11; 427/245, 255, 31, 901; 428/34.5, 34.6

(56) References Cited

U.S. PATENT DOCUMENTS

| | | | |
|---|---|---|---|
| 4,880,544 | * 11/1989 | Barone | 427/245 X |
| 4,902,307 | * 2/1990 | Gavalas et al. | 96/10 X |
| 4,980,069 | * 12/1990 | Gauger | 427/245 X |
| 5,415,891 | * 5/1995 | Liu et al. | 96/11 X |
| 5,429,743 | * 7/1995 | Geus et al. | 96/11 X |
| 5,453,298 | * 9/1995 | Gavalas et al. | 96/10 X |
| 5,487,774 | * 1/1996 | Peterson et al. | 96/11 X |
| 5,782,959 | * 7/1998 | Yang et al. | 96/11 |
| 5,789,024 | * 8/1998 | Levy et al. | 96/11 X |
| 5,827,569 | * 10/1998 | Akiyama et al. | 96/11 X |

* cited by examiner

Primary Examiner—Robert H. Spitzer
(74) Attorney, Agent, or Firm—Oblon, Spivak, McClelland, Maier & Neustadt, P.C.

(57) ABSTRACT

A method for the formation of a zeolite membrane, which comprises preparing raw materials (a) and (b) for the synthesis of zeolite, at least one of the raw materials containing water, positioning the raw material (a) for the synthesis of zeolite so as to contact one lateral face of a porous body and the raw material (b) therefor so as to contact the other lateral face of the porous body, causing the two raw materials (a) and (b) to permeate the porous body thereby forming an interface of the two raw material in pores of the porous body, and inducing a reaction of hydrothermal synthesis at the interface, a porous body obtained by the method and having a zeolite membrane formed in the pores thereof, and a membrane used for separation and purification of gas and formed of the porous body.

8 Claims, 1 Drawing Sheet

METHOD FOR PRODUCTION OF ZEOLITE MEMBRANE

BACKGROUND OF THE INVENTION

1. Field of the Invention

This invention relates to a method for the production of a zeolite membrane possessing a highly selective separating function and a porous body having a zeolite membrane formed by the method of production.

Zeolite is a material with pores whose diameters can be controlled to a high degree and is capable of selecting molecular shapes based on the pore diameters. When it can be manufactured into a defect-free membrane, the manufacture has a very high significance because the inorganic membrane consequently obtained abounds in heat resistance and chemical durability.

2. Prior Art Statement

Heretofore, zeolite membranes have been formed by the method of forming a thin detached layer of zeolite membrane on a supporting porous membrane. This method, however, is incapable of either forming a defect-free zeolite membrane or producing a membrane possessing a highly functional separating quality on account of the persistence of defects due to the presence of crystal grain boundaries in zeolite.

The primary object of this invention is to provide a method for forming a zeolite membrane possessing a highly selective separating function in a defect-state.

SUMMARY OF THE INVENTION

The present inventors, after pursuing a series of studies with a view to fulfilling the object mentioned above in a method for producing a zeolite membrane by the reaction of hydrothermal synthesis, have perfected a method for forming a zeolite membrane by separating the raw material for the synthesis of a zeolite membrane into two liquid components (a) and (b), causing the two liquid components to permeate pores in a porous body from the opposite sides of the body, allowing the two liquid components to form an interface within the pores, and thereafter subjecting the porous body to the reaction of hydrothermal synthesis. They have discovered that this method is capable of easily forming a zeolite membrane possessing a highly selective separating function and not suffering from defects caused by crystal grain boundaries or the like because it precipitates zeolite crystals in the pores and requires only to form very small crystals. The present invention has been accomplished as a result.

Specifically, this invention is directed at providing a method for the production of a zeolite membrane identified below and a porous body having a zeolite membrane formed therein.

The method according to this invention effects the formation of a zeolite membrane by preparing raw materials (a) and (b) for the synthesis of zeolite, at least one of the raw materials containing water, positioning the raw material (a) for the synthesis of zeolite so as to contact one lateral face of a porous body and the raw material (b) therefor so as to contact the other lateral face of the porous body, causing the two raw materials (a) and (b) to permeate the porous body thereby forming an interface of the two raw materials in pores of the porous body, and inducing a reaction of hydrothermal synthesis at the interface.

Concrete ways of implementing the method include:

The method for causing the raw materials (a) and (b) to permeate the pores in the porous body comprises placing the porous body in a sealed container with the raw materials for the synthesis on opposite sides thereof and depressing the interior of the container to deaerate the porous body and promote permeation of the raw materials (a) and (b) under a reduced pressure.

The method wherein the raw materials for the synthesis are a liquid containing an aluminum compound and a liquid containing a silicon compound and the zeolite is amino acid zeolite.

The method wherein the raw materials for the synthesis are a liquid containing a silicon compound and a liquid containing a templating agent and the zeolite is silica light.

The method wherein the raw materials for the synthesis are a liquid containing an aluminum compound and a liquid containing a phosphoric acid compound or a liquid containing an aluminum compound and a liquid containing a germanium compound, or a liquid containing a silicon compound and a liquid containing a gallium compound and the zeolite is a non-aluminosilicate type zeolite. The method further comprising forming microcrystals of zeolite in the pores.

This invention further embraces a porous body having a zeolite membrane formed in the pores as produced by any of the methods described above and a membrane made of the porous body and used for separating and purifying a gas.

DESCRIPTION OF THE PREFERRED EMBODIMENTS

Figure 1:
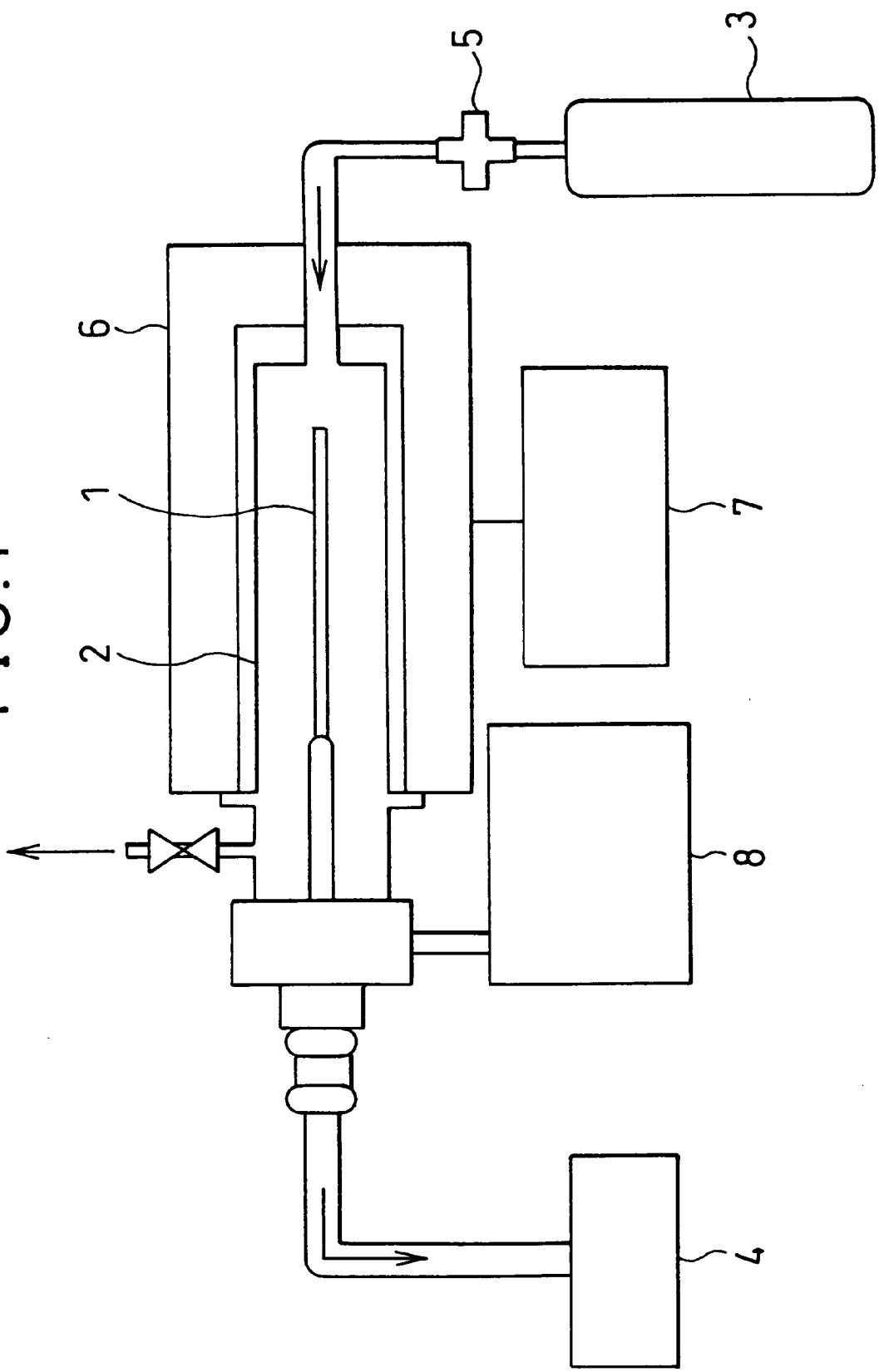
FIG. 1 is a cross section illustrating the construction of an apparatus for testing gas permeation.

In the method for the production of a zeolite membrane according to this invention, the reaction relevant to the production itself utilizes the hydrothermal synthesis heretofore known to the art.

The method of this invention does not particularly define the type of target zeolite membrane to be manufactured. It is capable of producing zeolite membranes of all kinds that can be synthesized by the hydrothermal reaction.

Concrete examples of zeolites which can be produced by the method of this invention include A type zeolite, X type zeolite, and Y type zeolite, which are aluminosilicate zeolites with low $SiO_2/Al_2O_3$ ratios, silica light, mordenite, and ferrierite, which are aluminosilicate zeolites (high silica zeolites) with high $SiO_2/Al_2O_3$ ratios, compounds of zeolite structure having aluminum or silica substituted with other elements, which are zeolites of the nonaluminosilicate configuration, and aluminophosphate molecular sieves.

The method of this invention begins by dividing the synthesizing raw material for use in the production of a zeolite membrane into two liquid components and preparing the liquid components (a) and (b).

The invention does not particularly limit the compositions of synthesizing liquid components (a) and (b). The method for production according to this invention is directed at forming a zeolite membrane at the interface of the two liquid components (a) and (b) in the pores of a porous body. For the purpose of preventing the reaction for the synthesis of zeolite from proceeding in only one of the liquid components, all the components essential to the synthesis of a zeolite membrane must not be present in only one of the liquid components and the components essential to the synthesis of the zeolite membrane must exist as divided in the two liquid components (a) and (b). Further, since the method of this invention utilizes the hydrothermal reaction, it is imperative that at least one of the two liquid components should contain water.

As regards the specific liquid compositions, it suffices to divide the conventionally used synthesizing raw material into the two liquid components (a) and (b), appropriately depending on the kind of zeolite membrane aimed at.

In the case of producing an aluminosilicate type zeolite, for example, since an aluminum compound, a silicon compound, and water are essential components, it generally suffices to have the aluminum compound present in one of the liquid components (hereinafter referred to as "liquid a") and the silicon compound present in the other liquid component (hereinafter referred to as "liquid b"). Water must may be present in at least one of the liquid a and the liquid b.

As the aluminum compound to be incorporated in the liquid a, a water-soluble aluminum compound may be used, for example. Concrete examples of aluminum compound suitable for incorporation include aluminum nitrate and sodium aluminate. Solvents generally usable in the liquid include a polar solvent such as alcohols, methanol and ethanol, and water.

Concrete examples of silicon compound to be incorporated in the liquid b include silicon alkoxides such as tetramethoxy silane and tetraethoxy silane, water-soluble silane compounds such as water glass, and colloidal silica. In the case of using a silicon alkoxide, though this compound may be used in its unmodified form when it is in a liquid state, it may be optionally used as diluted with an alcohol such as methanol or ethanol. In the case of using the silicon alkoxide, it is advisable to avoid the addition of water to the liquid b because this compound tends to be gelated by polymerization in the presence of water. In the case of using a water-soluble silane compound or colloidal silica, for example, this compound may be used as diluted with a polar solvent such as an alcohol, like methanol and ethanol, or water, for example.

As regards the concentration of the aluminum compound in the liquid a and the concentration of the silicon compound in the liquid b, it suffices to select these concentrations in the same ranges of concentration as are adopted in the case of synthesizing zeolite by the conventional hydrothermal reaction using a solution containing an aluminum compound and a silicon compound. Though no particular limit is imposed on the concentrations of the individual components, it generally suffices to set the concentration of the aluminum compound in the liquid a in the approximate range of 0.01–0.1 mol/liter and the concentration of the silicon compound in the liquid b in the approximate range of 1–3 mols/liter. The molar concentration ratio of the aluminum compound and the silicon compound may be equal to that which is adopted in conventional synthesis.

As regards the other components to be used in the synthesis of a zeolite membrane, such components as, for example, a mineralizer, a templating agent, a crystal growing agent, and an alkali compound which have been heretofore used in the hydrothermal reaction may be used, depending on the kind of a zeolite membrane aimed at. These components may be added to either or both of the liquid a and the liquid b.

Among these components, the mineralizer plays the role of accelerating the crystallization of zeolite. As the mineralizing agent, any of the well-known components such as NaCl, for example, may be used. The amount of the mineralizing agent does not need to be particularly limited but may be selected in the same range as is used in the conventional method of hydrothermal synthesis. This mineralizer is particularly effective when it is added in an amount in the range of 0.4–0.6 times the weight amount of the alkali compound which will be specifically described below.

Use of the templating agent is optional. In the case of a high silica zeolite having a $SiO_2/Al_2O_3$ molar ratio of not less than about 10, however, the incorporation of the templating agent allows formation of zeolite crystals. Since the relation between the kind of templating agent to be used and the kind of zeolite to be formed is well known to the art, it suffices to use a templating agent of the same kind as used in the conventional method for the production of zeolite, depending on the kind of zeolite aimed at. There are times when giant crystals with only slight defects are obtained by using a plurality of templating agents in a combined form. The combination may be used in the same manner as in the conventional method of use. Typical examples of templating agents which are effectively used herein include tetraalkyl ammonium compounds (hydroxides, halogenides, etc.) such as tetramethyl ammonium salts, tetraethyl ammonium salts, tetra-n-propyl ammonium salts, and tetra-n-butyl ammonium salts, phosphonium compounds (hydroxides, halogenides, etc.) such as tetrabutyl phosphonium salts and benzyl triphenyl phosphonium salts, and $(C_5H_3N_2)_2O$.

The amount of the templating agent to be used does not need to be particularly limited but may be set in the same range as is used in the conventional hydrothermal method. It is advisable to use the templating agent in an amount in the approximate range of 0.3–0.7 mol, preferably 0.4–0.6 mol, per mol of the silicon compound.

The hydrothermal reaction for the synthesis of zeolite is generally proceeds in an alkali region. It is, therefore, preferable to adjust either or both of the liquid a and the liquid b to an alkali state. In the case of using a silicon alkoxide as the silicon compound, however, it is advisable to alkalinize only the liquid a because the silicon alkoxide may be gelated by polymerization before the reaction for the synthesis of zeolite can proceed at the interface between the two liquids when the liquid b is alkalinized.

For the purpose of alkalinizing either or both of the liquid a and the liquid b, it suffices to use an alkali metal hydroxide such as NaOH or KOH or an alkali compound such as $NH_4OH$, for example. Generally, it suffices to effect this adjustment to a pH level appropriate for the hydrothermal reaction, which falls in the approximate range of pH 7–4, depending on the kind of zeolite aimed at. When an alkali metal hydroxide is incorporated, this compound additionally serves as a metal source for the alkali metal to be contained in the zeolite membrane.

With respect to silica light which, among other high silica zeolites, contains substantially no aluminum, one of the liquid components may be made to incorporate therein a silicon compound and the other liquid component to incorporate therein a templating agent such as tetra-n-propyl ammonium salt, for example. The other raw material components such as, for example, a mineralizing agent and an alkali compound may be incorporated in either or both of the two liquid components.

Also in the case of producing a non-aluminosilicate zeolite, similarly to the case of producing an aluminosilicate zeolite, the components essential to the hydrothermal reaction of zeolite may be present as divided in two liquid components. In all other respects, the production can be the same as the production of an aluminosilicate type zeolite.

In the case of producing an aluminophosphate molecular sieve, for example, among other non-aluminosilicate zeolites, it suffices to have one of the two liquid components incorporate therein an aluminum compound and the other liquid component incorporate therein a phosphoric acid compound.

Then, in the case of producing a zeolite containing aluminum and germanium, among other non-aluminosilicate type zeolites, it suffices to use synthesizing raw materials which are divided into two liquid components, i.e. one incorporating therein an aluminum compound and the other incorporating therein a germanium compound.

In the case of producing a zeolite containing silicon and gallium, among other non-aluminosilicate type zeolites, it suffices to use synthesizing raw materials which are divided into two liquid components, i.e. one incorporating therein a silicon compound and the other incorporating therein a gallium compound.

As the raw material components for use in the production of such a non-aluminosilicate type zeolite as mentioned above, the same components as the compounds which have been heretofore used for the production of a non-aluminosilicate type zeolite by the hydrothermal reaction may be used. As the aluminum compound and the silicon compound, for example, the same compounds as used in the case of producing the aforementioned aluminosilicate type zeolite may be used. As the phosphoric acid compound, phosphoric acid and sodium phosphate may be used. As the germanium compound, germanium ethoxide and germanium nitrate may be used. As the gallium compound, gallium nitrate may be used. As the other components such as, for example, a mineralizing agent and a templating agent, the same compounds as those heretofore used may be used. It suffices to have these components present in either or both of the two liquid components.

The other conditions to be adopted may be the same as those for use in the production of an aluminosilicate type zeolite. It suffices to have water present in either or both of the liquid components into which the synthesizing raw materials have been divided. In the case of using a metal alkoxide as a raw material, for example, it is advisable to avoid adding water to the liquid component containing the metal alkoxide for the purpose of preventing gelation by polymerization.

The method for producing a zeolite membrane by using the synthesizing raw materials which have been divided into two liquid components as described above will now be explained.

The method of this invention begins by separating the synthesizing raw materials divided into two liquid components within a porous body. The kind of porous body to be used is not particularly defind. It is only required to be made of a material incapable of reacting with the synthesizing raw materials to be used in the production of the zeolite membrane or with a gas, a liquid, etc. to which the porous body is exposed while the zeolite membrane is in actual use. As concrete examples of the material which answers this description include porous glass, porous ceramics such as alumina, silica, zirconia, and titania, and porous metals such as stainless steel and Monel metal. Though the diameters of the pores in these porous materials are not particularly limited, the pores are preferred to have diameters in the approximate range of 0.01–5 $\mu$m particularly in the approximate range of 0.05–0.2 $\mu$m.

The porous body is not particularly defind by shape. The shape is only required to be capable of separating the synthesizing raw materials which divided into the two liquid components. For example, the separation of the two liquid components within the porous body can be accomplished by shaping the porous body as a blind tube, placing one of the synthesizing raw materials in the tube, and immersing this tube in a container holding the other synthesizing raw material. Alternatively, the separation of the two liquid components can be attained by shaping the porous body as a flat plate, partitioning a container with the plate as a diaphragm into two chambers, and placing the synthesizing raw materials divided into two liquid portions one each in the two chambers.

The porous body is generally preferred to have a wall thickness in the approximate range of 0.5–1 mm.

The synthesizing raw materials a and b are caused to permeate the porous body from its opposite sides, i.e., one from the front surface and one from the rear surface. This can be achieved by any of various methods. For example, it can be achieved by placing the porous body in a closed container with the synthesizing raw materials on its opposite sides and then reducing the pressure inside the closed container so as to expel air from the porous body. The synthesizing raw materials a and b will then permeate the pores from the opposite sides of the porous body. The degree to which the depressurization is carried out in this case is not particularly limited. The depressurization needed only be of a degree great enough to thoroughly by remove the air from the pores. It generally suffices to vacuumize the pores to a pressure in the approximate range of 10–500 Torrs.

Thus, the synthesizing raw materials are enabled to permeate the pores of the porous body from the opposite sides and form an interface of the two liquid components inside the pores. The position at which the interface of the two liquid components is formed inside the pores can be controlled by adjusting the two liquid components in viscosity as by proper dilution.

Subsequently, the zeolite membrane is synthesized by the hydrothermal reaction after the synthesizing raw materials have permeated the pores of the porous body. In accordance with this method, since the components necessary for the synthesis of zeolite are divided into two liquid components, the reaction for the synthesis of zeolite proceeds exclusively at the interface of the two liquid components in the pores and the zeolite membrane is formed in the part of the interface of the two liquid components. Since this method induces precipitation of zeolite crystals inside the pores, defect-free zeolite of high performance can be easily formed simply by effecting formation of very small crystals. Moreover, the speed of the permeation can be increased because the zeolite formed at one place somewhere in a pore suffices for the purpose of a partition membrane.

The conditions for the hydrothermal reaction may be the same as the conditions adopted for the conventional hydrothermal reaction for the synthesis of a zeolite membrane. For example, the reaction may be carried out in such a closed pressure container as an autoclave at a temperature in the approximate range of 120–200° C., preferably in the approximate range of 140–170° C., for a period in the approximate range of 8–72 hours, preferably in the approximate range of 20–30 hours. The specific reaction conditions may be set so as to equal the conditions for the well-known hydrothermal reaction, depending on the kind of zeolite membrane aimed at.

According to the method of this invention, the zeolite membrane can be synthesized by the procedure described above. In the case of using a templating agent as one of the raw material components, the formed zeolite membrane may be optionally heated in the open air at a temperature in the approximate range of 400–600° C. for a period in the approximate range of 4–8 hours, with the result that the templating agent, which is an organic component, will be volatilized in the form of nitrogen oxide, water, and carbon dioxide gas and consequently expelled from zeolite membrane.

By this invention, it is allowable to have microcrystals of zeolite occur within the pores of the porous body before these pores are filled with the synthesizing raw materials divided into the two liquid components mentioned above, then cause the synthesizing raw materials divided into the two liquid components to permeate and fill to capacity the pores of the porous body from the opposite sides of the porous body, and carry out the hydrothermal reaction. According to this method, owing to the occurrence of the microcrystals within the pores prior to the start of the hydrothermal reaction, a zeolite membrane can be formed in a substantially defect-free state within the pores because zeolite crystals grow with the microcrystals as the cores and give birth to giant crystals of zeolite.

The largest diameters of the microcrystals of zeolite may be equal to or smaller than the diameters of the pores. The method for causing the occurrence of the microcrystals of zeolite within the pores is not particularly restricted. In the method for the production of the zeolite membrane mentioned above, for example, a procedure can be adapted which comprises filling the pores of the porous body with the synthesizing raw materials divided in advance into the two liquid components, then extracting the porous body from the synthesizing raw materials, and thereafter commencing the hydrothermal reaction. This allows the microcrystals which have the diameters thereof automatically controlled to be formed within the pores because the supply of the reaction solution is blocked and the reaction solution is limited to the portion thereof which now exists within the pores.

Another method for causing the presence of the microcrystals of zeolite within the pores comprises finely pulverizing zeolite crystals formed in advance, optionally dispersing the pulverized zeolite crystals in an organic solvent such as alcohol or water, and introducing the finely pulverized zeolite crystal or the dispersion into the pores by a pressing method using a compressor or by a vacuumizing method using a rotary pump, for example.

Once the presence of the microcrystals of zeolite within the pores has been attained, it suffices to position the synthesizing raw materials divided into the two liquid components one each on the opposite sides of the porous body, then causing the two liquid components to permeate and fill to the pores from the opposite sides of the porous body, and synthesize zeolite at the interface of the two liquid components within the pores by the hydrothermal reaction in the same manner as in the method described above.

The porous body which has the zeolite membrane formed within the pores thereof by the method of this invention assumes a highly efficient separating property owing to the formation of a substantially defect-free zeolite membrane within the pores. The porous body which has the zeolite membrane formed in this manner is inherently possessed of a pore diameter, a surface electric field, an ion-exchange ability, and an ability to effect adsorption and desorption, depending on the kind of zeolite membrane. It can be effectively used, therefore, as a separating membrane possessed of fine characteristic properties in various fields in which zeolite has been heretofore used.

As a separating membrane for isolating and refining a gas, for example, the porous body can be effectively used for the purpose of adsorbing, separating, and drying a gas.

The method for the production of the zeolite membrane of this invention can form defect-free zeolite of high performance by simply forming very small crystals because the method induces precipitation of zeolite crystals within the pores of the porous body. Moreover, the speed of the permeation can be increased because the zeolite formed at one place somewhere in a pores suffices for the purpose of a partition membrane.

This invention will now be described more specifically below with reference to working examples.

EXAMPLE 1

A blind tube of porous alumina, 7 cm in length, 0.7 cm in inside diameter, and 1.0 cm in outside diameter, was filled with 5.78 g of tetraethoxy silane (TEOS). This porous alumina tube was placed in a test tube of glass measuring 2.0 cm in inside diameter and 20.0 cm in length and containing 1.47 g of tetrapropyl ammonium bromide as a templating agent, 0.19 g of sodium hydroxide, and 25.5 g of water. Then, the test tube was placed in a decompressing container and the decompressing container was deaerated by the use of an aspirator to reduce the pressure in the container to 380 Torrs and introduce the reaction solution into the pores of the porous alumina tube.

Subsequently, the test tube containing the porous alumina tube was extracted from the decompressing container and heated in an autoclave at 160° C. for 24 hours so as to form a silica light membrane within the pores of the porous alumina tube by the hydrothermal reaction.

Thereafter, the porous alumina tube was heated in the open air at 450° C. for four hours to decompose the tetrapropyl ammonium bromide as a templating agent for the purpose of expulsion from the tube.

The porous alumina tube having the silica light membrane formed in the pores thereof in the manner described above was used as a gas separating membrane and tested for ability to separate various gases by the following method with the aid of an apparatus for testing gas permeation which is illustrated in FIG. 1.

First, the porous alumina tube (separating membrane) 1 having the silica light membrane formed therein was sealed at one end thereof and was installed in a test chamber formed of a stainless pipe 2 in the aforementioned apparatus for testing permeation of gas. Then, a prescribed gas from a gas cylinder 3 was introduced under a prescribed pressure into the test chamber, a gas for stabilizing the flow volume of the gas was introduced for one hour, and then the amount of the gas permeating the separating membrane 1 was measured with a mass flow meter 4. The temperature inside the test chamber was set at 250° C. Subsequently, the measurement was performed by following the procedure just described while varying the kind of gas. In FIG. 1, 5 stands for a pressure adjusting device, 6 for an electric furnace, 7 for a temperature adjusting device, and 8 for a cooling device.

The selectivity of the gas separating membrane formed of the porous alumina tube mentioned above was determined in terms of the rate of gas permeation expressed as the numerical value obtained by dividing the permeating amount of a gas by the pressure difference on the opposite sides of the membrane and the area of the membrane. The results are shown in Table 1 below.

TABLE 1

Selectivity for gas, $\alpha = P_A/P_B$ (250° C.)

| A\B | He | $H_2$ | $CO_2$ | $O_2$ | $N_2$ | $n-C_4H_{10}$ | Iso-$C_4H_{10}$ |
|---|---|---|---|---|---|---|---|
| He | 1 | — | — | — | — | — | — |
| $H_2$ | 2.2 | 1 | — | — | — | — | — |
| $CO_2$ | 7.6 | 3.5 | 1 | — | — | — | — |
| $O_2$ | 55 | 58 | 7.0 | 1 | — | — | — |
| $N_2$ | 470 | 65 | 31 | 5.5 | 1 | — | — |
| $n-C_4H_{10}$ | 633 | 1010 | 966 | 221 | 153 | 1 | — |
| Iso-$C_4H_{10}$ | 576 | 790 | 745 | 174 | 87 | 84 | 1 |

$P_{H2} = 5.5 \times 10^{-6}/cm^3$ (STP) $cm^{-2}s^{-1}$ $mmHg^{-1}$

It is clear from the results given above that the porous glass tube having a silica light membrane formed therein by this invention exhibited fine gas selectivity.

EXAMPLE 2

A porous alumina tube and a test tube similar in shape to those used in Example 1 were used. The porous alumina tube was filled with 2.00 g of tetraethoxy silane and the test tube was made to contain 0.013 g of tetrapropyl ammonium bromide and 0.0074 g of tetramethyl ammonium bromide as templating agents (molar ratio of tetrapropyl ammonium bromide:tetramethyl ammonium bromide=1:2), 0.082 g of sodium hydroxide, and 25.25 g of water. These tubes were processed in the same manner as in Example 1 to form a silica light membrane in the pores of the porous alumina tube by the hydrothermal reaction and decompose the tetrapropyl ammonium bromide and the tetramethyl ammonium bromide as templating agent for the purpose of expulsion.

The porous alumina tube having the silica light membrane formed in the pores thereof as described above was used as a gas separating membrane and tested for ability to separate different gases by the same method as in Example 1. The results are shown in Table 2 below.

TABLE 2

Selectivity for gas, $\alpha = P_A/P_B$ (250° C.)

| A\B | He | $H_2$ | $CO_2$ | $O_2$ | $N_2$ | $n-C_4H_{10}$ | Iso-$C_4H_{10}$ |
|---|---|---|---|---|---|---|---|
| He | 1 | — | — | — | — | — | — |
| $H_2$ | 2.5 | 1 | — | — | — | — | — |
| $CO_2$ | 8.5 | 3.7 | 1 | — | — | — | — |
| $O_2$ | 58 | 62 | 8.1 | 1 | — | — | — |
| $N_2$ | 478 | 68 | 33 | 6.1 | 1 | — | — |
| $n-C_4H_{10}$ | 650 | 1149 | 983 | 253 | 169 | 1 | — |
| iso-$C_4H_{10}$ | 591 | 896 | 774 | 185 | 121 | 89 | 1 |

$P_{H2} = 4.8 \times 10^{-6}/cm^3$ (STP) $cm^{-2}s^{-1}$ $mmHg^{-1}$

The porous glass tube having the silica light membrane formed therein by the method of Example 2 exhibited fine selectivity for gas. The reason for this fine gas selectivity is thought to be that the use of the two species of templating agent at a specific molar ratio of 1:2 allowed formation of giant crystals possessing crystal grain boundaries only sparingly and induced effective occlusion of the pores with silica light crystals.

EXAMPLE 3

Under the same conditions as used in Example 1, a porous alumina tube was filled with tetraethoxy silane, this porous alumina tube was placed in a test tube made to contain tetrapropyl ammonium bromide, sodium hydroxide, and water, and the test tube was deaerated in a decompressing container by vacuumization to introduce the reaction solution into the pores of the porous alumina tube. As a result, microcrystals of a silica light were formed in the pores of the porous alumina tube.

Then, the porous alumina tube was extracted alone from the decompressing container and heated in an autoclave at 160° C. for 24 hours. As a result, microcrystals of a silica light were formed in the pores of the porous alumina tube.

Subsequently, the porous alumina tube was subjected to the same procedure as adopted in Example 1 to form a silica light membrane within the pores and decompose the templating agent for the purpose of expulsion.

The porous alumina tube having the silica light membrane formed in the pores thereof as described above was used as a gas separating membrane and tested for ability to separate different gases by the same method as in Example 1. The results are shown in Table 3 below.

TABLE 3

Selectivity for gas, $\alpha = P_A/P_B$ (250° C.)

| A\B | He | $H_2$ | $CO_2$ | $O_2$ | $N_2$ | $n-C_4H_{10}$ | Iso-$C_4H_{10}$ |
|---|---|---|---|---|---|---|---|
| He | 1 | — | — | — | — | — | — |
| $H_2$ | 2.7 | 1 | — | — | — | — | — |
| $CO_2$ | 8.7 | 4.3 | 1 | — | — | — | — |
| $O_2$ | 62 | 64 | 8.4 | 1 | — | — | — |
| $N_2$ | 510 | 74 | 37 | 6.3 | 1 | — | — |
| $n-C_4H_{10}$ | 720 | 1235 | 1003 | 271 | 188 | 1 | — |
| iso-$C_4H_{10}$ | 664 | 1100 | 910 | 213 | 131 | 107 | 1 |

$P_{H2} = 5.1 \times 10^{-6}/cm^3$ (STP) $cm^{-2}s^{-1}$ $mmHg^{-1}$

The porous glass tube having a silica light membrane formed therein by the method of Example 3 was exhibited fine gas selectivity. The reason for, this fine gas selectivity is thought to be that since microcrystals of silica light were provisionally formed in the pores of the porous glass tube and the reaction for the synthesis of silica light was initiated subsequently, zeolite crystals grew with the microcrystals as seeds and induced formation of giant crystals of zeolite and eventual production of a zeolite membrane in a substantially defeat-free state.

We claim:

1. A method for the formation of a zeolite membrane, which comprises preparing raw materials (a) and (b) for the synthesis of zeolite, at least one of the raw materials containing water, positioning said raw material (a) for the synthesis of zeolite so as to contact one lateral face of a porous body and said raw material (b) therefor so as to contact the other lateral face of said porous body, causing said two raw materials (a) and (b) to permeate said porous body thereby forming an interface of said two raw materials in pores of said porous body, and inducing a reaction of hydrothermal synthesis at said interface.

2. A method according to claim 1, wherein the method for causing said raw materials (a) and (b) to permeate the pores of said porous body comprises placing said porous body in a closed container with said raw materials on opposite sides thereof and depressurizing the interior of said closed container.

3. A method according to claim 1, wherein said raw materials are a liquid containing an aluminum compound and a liquid containing a silicon compound and said zeolite is an amino acid zeolite.

4. A method according to claim 1, wherein said raw materials are a liquid containing a silicon compound and a liquid containing a templating agent and said zeolite is silica light.

5. A method according to claim 1, wherein said raw materials are a liquid containing an aluminum compound and a liquid containing a phosphoric acid compound, or a liquid containing an aluminum compound and a liquid containing a germanium compound, a liquid containing a silicon compound and a liquid containing a gallium compound and said zeolite is a non-aluminosilicate type zeolite.

6. A method according to claim 1, wherein microcrystals of zeolite are formed in said pores.

7. A porous body produced by a method set forth in claim 1 and having a zeolite membrane formed in pores thereof.

8. A process for separating and purifying a gas comprising passing the gas through the porous body of claim 7.

* * * * *